United States Patent Office 3,515,866
Patented June 2, 1970

3,515,866
TRIFLUOROMETHYL BENZIMIDAZOLES
Harry Goldsmith, Brea, and Robert F. Crawford, La Mirada, Calif., assignors to United States Borax & Chemical Corporation, Los Angeles, Calif., a corporation of Nevada
No Drawing. Continuation-in-part of application Ser. No. 366,141, May 8, 1964. This application Apr. 11, 1967, Ser. No. 629,930
Int. Cl. C07d 49/38
U.S. Cl. 260—309.2　　　　　　　　　3 Claims

ABSTRACT OF THE DISCLOSURE

Trifluoromethyl-benzimidazole compounds having at least one trifluoromethyl substituent on a carbon atom of the benzimidazole molecule are provided. The benzimidazoles can also be substituted with other groups such as alkyl, halogen and alkoxy. The compounds are especially useful as herbicides for controlling weed growth.

This application is a continuation-in-part of our copending application Ser. No. 366,141 filed May 8, 1964, now abandoned.

This invention relates to trifluoromethyl benzimidazole compounds and, more particularly, to compositions and methods of utilizing trifluoromethyl-substituted benzimidazoles as herbicides.

Benzimidazoles are heterocyclic compounds based on the structure

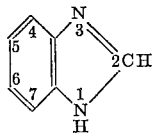

Those benzimidazoles possessing a free imino hydrogen (in the 1-position) are tautomeric systems and the derivatives not possessing a plane of symmetry can exist in two possible tautomeric forms. Thus, the 4- or 5-substituted benzimidazoles can also exist in the 7- or 6-substituted forms, respectively. Therefore, whenever, a mono- or poly-substituted benzimidazole not possessing a plane of symmetry is named, it is usually referred to using both positions, as, for example, 5(6)-chlorobenzimidazole or 4(7)-chlorobenzimidazole. This system of nomenclature is followed in the following description and claims.

According to the present invention, there are provided novel herbicidal compositions and methods utilizing a trifluoromethyl-substituted benzimidazole having at least one trifluoromethyl group on a carbon atom of said benzimidazole molecule. Thus, the benzimidazole compounds of the present invention can have a trifluoromethyl substituent in the 2-, 4-, 5-, 6-, or 7-position, or combinations thereof, of the parent benzimidazole compound. The trifluoromethyl-substituted benzimidazoles can also have other substituents on the parent molecule which do not detract from the beneficial herbicidal properties of the compound. One or more of such substituents can be in the 1-, 2-, 4-, 5-, 6-, or 7-position of the benzimidazole molecule. Examples of such suitable substituents include alkyl groups, especially the lower alkyl groups such as methyl, ethyl, n-propyl, isopropyl, n-butyl, sec.-butyl and n-hexyl, halogen atoms, especially chlorine and bromine, and alkoxy radicals, especially the lower alkoxy radicals such as methoxy, ethoxy, propoxy, and the like.

The trifluoromethyl benzimidazoles are readily prepared by known general procedures, depending on the position of the trifluoromethyl group.

The 2-trifluoromethylbenzimidazoles are prepared by reaction of the corresponding o-phenylenediamine with trifluoro-acetic acid in the presence of an aqueous solution of mineral acid such as dilute hydrochloric acid. The reaction takes place at elevated temperatures such as in the range of from about 75° C. to the reflux temperature of the reaction solution to give the desired 2-trifluoromethylbenzimidazole in a relatively short period of time. The desired product is isolated, such as by filtration, after neutralization of the reaction mixture to pH of about 6 with an aqueous base, such as ammonium hydroxide. The crystalline product can be purified by conventional procedures, such as recrystallization, to give the pure crystalline product. The 2-trifluoromethylbenzimidazoles are soluble in alcohol, slightly soluble in hydrocarbons such as benzene, and insoluble in water. They form water-soluble salts with bases such as sodium hydroxide.

The benzimidazoles having a trifluoromethyl substituent in the 4-, 5-, 6-, or 7-position, are prepared by reaction of the corresponding trifluoromethyl-substituted o-phenylenediamine with an organic acid in the presence of an aqueous solution of dilute mineral acid such as hydrochloric acid. The reaction takes place at an elevated temperature such as about the reflux temperature of the reaction mixture and the crude product can be isolated from the cooled reaction mixture after treatment with an aqueous base, such as ammonium hydroxide. The crystalline product is purified by conventional procedures, such as recrystallization, and is soluble in alcohols and insoluble in water. The compounds form water-soluble salts with acids such as hydrochloric acid.

The benzimidazole compounds having a halogen substituent in the 2-position are prepared by reaction of the corresponding benzimidazolone with a halogenating agent such as phosphorus oxychloride, phosphorus oxybromide or phosphorus pentachloride as described in the present applicants' copending application Ser. No. 344,220 filed Feb. 12, 1964, now U.S. Pat. 3,317,304. The resultant compounds can be represented by the formula

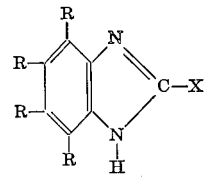

wherein X is halogen such as bromo or chloro and at least one of the R's is trifluoromethyl. Each remaining R is hydrogen or another substituent such as alkyl, halogen or alkoxy, as described above.

The following examples are presented to illustrate the preparation of representative compounds of this invention, but it is to be understood that the invention is not to be limited to the specific examples given.

EXAMPLE I 2-trifluoromethyl-5(6)-chlorobenzimidazole

A solution of 28.6 grams (0.2 mole) of 4-chloro-o-phenylenediamine and 22.8 grams (0.2 mole) of trifluoro-acetic acid in 200 ml. of 4 N aqueous hydrochloric acid was refluxed for 3 hours and then allowed to stand overnight at room temperature. A large quantity of solid precipitated. The cool mixture was diluted with 400 ml. of water and neutralized to pH 6 by dropwise addition of 5 N aqueous ammonium hydroxide while stirring. The crude crystalline product was collected by filtration, washed with water and dried. Recrystallization of the tan solid from benzene gave 30.0 grams (68% yield) of the white, crystalline product, M.P. 198°–199° C.

EXAMPLE II

2-isopropyl-5(6)-trifluoromethylbenzimidazole

A solution of 35.2 grams (0.2 mole) of 3,4-diaminobenzotrifluoride and 17.6 grams (0.2 mole) of isobutyric acid in 260 ml. of 4 N aqueous hydrochloric acid was heated at reflux temperature for 16 hours. The reaction mixture was diluted with water and was basefied by adding slowly to a cold solution of 4 N ammonium hydroxide. The precipitated solid product was removed by filtration. After treatment with activated charcoal and recrystallization from aqueous ethanol, the pure crystalline product melted at 192°–194° C.

EXAMPLE III

2-chloro-5(6)-trifluoromethylbenzimidazole

To 40 ml. of phosphorous oxychloride in a round bottom flask was added 2.5 grams of 5(6)-trifluoromethylbenzimidazolone (prepared by reaction of 4-trifluoromethyl-o-phenylenediamine with urea according to the procedure of Kym, J. Prakt. Chem., 75, 323 [1907]; Chem. Abst., 1, 2248). The mixture was heated to reflux and anhydrous HCl bubbled through the solution for 4 hours. The reaction mixture was cooled to room temperature and added to a beaker of ice with vigorous stirring. The cold ice solution was then neutralized with concentrated ammonium hydroxide to give a white precipitate. Isolation of the product by filtration gave 1.3 grams (49% yield), M.P. 169°–175° C. After recrystallization from benzene, the product melted at 177°–178° C.

EXAMPLE IV

2-bromo-5(6)-trifluoromethylbenzimidazole

Following the general procedure of Example III, 2-bromo-5(6)-trifluoromethylbenzimidazole is prepared by bromination of 5(6)-trifluoromethylbenzimidazolone with phosphorous oxybromide and HBr.

Other compounds embraced by the present invention which can be prepared according to the above-described procedures include:

2-trifluoromethyl-4(7)-methylbenzimidazole
2-trifluoromethyl-5(6)-methoxybenzimidazole
2-trifluoromethyl-5(6)-bromobenzimidazole
2-trifluoromethyl-5(6)-ethylbenzimidazole
2-trifluoromethylbenzimidazole
2-methyl-5(6)-trifluoromethylbenzimidazole
2-cyclopropyl-5(6)-trifluoromethylbenzimidazole
1-methyl-2-n-butyl-5-trifluoromethylbenzimidazole
2-chloro-5(6)-trifluoromethylbenzimidazole
2-methyl-4,7-dichloro-5(6)-trifluoromethylbenzimidazole
5(6)-trifluoromethylbenzimidazole.

The trifluoromethyl benzimidazoles of this invention are effective herbicidal compounds useful for controlling weed growth. "Weeds" as used herein is intended to include any plant growth which is undesirable. The compounds are useful as a pre-emergence or a post-emergence treatment; that is, they can be used to kill growing plants or they can be used to kill or prevent the emergence of seedlings of the plant. Thus, the compounds can be used to control the growth of weeds by applying a phytotoxic amount to the locus of the weeds, that is, to the foliage of the growing weeds or to soil in which the weeds are growing or will grow.

An application rate in the range of from about 0.25 to 50 pounds of one or more of the active compounds per acre is generally an effective phytotoxic amount, although greater or lesser amounts can be used if desired. The presently preferred application rate is in the range from about 1 to 20 pounds per acre. At lower application rates, such as from about 1 to about 12 pounds per acre, the compounds are useful as selective herbicides for killing weeds in the presence of desirable crops. For example, at the lower rates of application, many of the compounds can be used as a selective herbicide for controlling weed growth in corn without serious injury to the corn plants.

The following examples are presented to illustrate the herbicidal activity of representative compounds of this invention:

EXAMPLE V 2-trifluoromethyl-5(6)-chlorobenzimidazole was applied as a methanol solution at a rate of 15 pounds per acre to corn, millet, ryegrass, peas, mustard, cucumbers and snap beans. The compound was applied as both a pre-emergence treatment and post-emergence treatment. Twenty-four days after application, all plants but corn were killed by the pre-emergence treatment. The corn plants were injured but most of the plants were not killed. Of the plants treated by the post-emergence treatment, all snap beans, cucumbers, mustard and millet plants were killed, and about 90 percent of the peas and ryegrass was killed. The corn plants showed some phytotoxic effect, but most of the plants were not killed.

EXAMPLE VI 2-isopropyl-5(6)-trifluoromethylbenzimidazole was applied as a methanol solution to corn, millet, ryegrass, oats, peas, mustard, cucumbers and snap beans. The chemical was applied at a rate of 2.7 pounds per acre as both a pre-emergence and post-emergence treatment. Thirty days after application, all plants were dead when the chemical was applied as a pre-emergence treatment, and all plants, except corn, were dead when the chemical was applied as a post-emergence treatment. The corn plants had some injury but were not killed.

EXAMPLE VII 2-chloro-5(6)-trifluoromethylbenzimidazole was applied as an ethanol solution to bindweed, velvetleaf, ragweed, pigweed, watergrass, crabgrass and peanuts. The chemical was applied as a post-emergence treatment at an application rate of 4 pounds per acre. Twenty-one days after treatment, substantially all the weed species were killed with no apparent injury to the peanuts.

Since a relatively small amount of one or more of the active trifluoromethyl benzimidazoles should be uniformly distributed over the area to be treated, the compounds preferably are formulated with conventional herbicidal carriers, either liquid or solid. Thus, the compounds can be impregnated on or admixed with a solid carrier such as lime, talc, clay, bentonite, calcium chloride, vermiculite, calcium carbonate, and the like. Alternatively, the compounds can be dissolved or suspended in a liquid carrier such as water, kerosene, alcohols, diesel oil, xylene, benzene, glycols, and the like. A surfactant preferably is included to aid in dispersion, emulsification and coverage. The surfactant can be ionic or nonionic, and may be liquid or a solid. The use of the term "surfactant" herein is intended to include such compounds commonly referred to as wetting agents, dispersing agents and emulsifying agents. Typical surfactants include the alkylarylsulfonates, the fatty alcohol sulfates, sodium salt of naphthalenesulfonic acid alkylaryl polyether alcohols, long chain quaternary ammonium compounds, sodium salts of petroleum-derived alkylsulfonic acid, polyoxyethylene sorbitan monolaurate, and the like. These dispersing and wetting agents are sold under numerous trademarks and may either be pure compounds, mixtures of compounds of the same general group, or they may be mixtures of compounds of different classes. Surfactants can also be included in compositions containing a solid inert carrier.

Concentrated compositions containing the active herbicidal agent which can be subsequently diluted as with water, to the desired concentration for application to plants and soil are also provided. The advantages of such concentrates are that they are prepared by the manufacturer in a form such that the user need only mix them with a locally available carrier, preferably water, thereby keeping shipping costs to a minimum while providing a product which can be used with a minimum of equipment and effort. Such concentrates may contain from about 5 to about 99 percent by weight of one or more of the active trifluoromethyl benzimidazoles with a carrier or diluent, which may be a solid or liquid. Liquid carriers which are miscible with the active agent or other liquids in which the compound may be suspended or dispersed may be used. A surfactant is also generally included to facilitate such dilution or dispersion in water. However, the surfactant itself may comprise the carrier in such concentrates.

Since the compounds will form salts, such as with strong acids and strong bases, they can be readily formulated as the salt of the compound in an aqueous solution. Particularly useful salts are the hydrochloride salt and alkali metal salts such as sodium, which are water-soluble and preferred for many applications.

The herbicidal compositions can include other beneficial adjuvants, such as humectants, oils and contact agents. Also other herbicides, such as sodium chlorate and the sodium borates or mixtures thereof, 2,3,6-trichlorobenzyloxypropanol, the chlorophenoxyacetic acids, trichlorobenzoic acids, substituted ureas, triazines, uracils and carbamates, can be included in the formulations.

The following examples are presented to illustrate preparation of suitable herbicidal compositions of the present invention.

EXAMPLE VIII

| | Percent |
|---|---|
| 2-ethyl-5(6)-trifluoromethylbenzimidazole | 15 |
| Alkylarylpolyethyleneglycol surfactant | 5 |
| Ethylene glycol | 40 |
| Isopropanol | 40 |

The above liquid formulation can be diluted with water to form an emulsion and the emulsion sprayed with conventional spray equipment on soil or plants.

EXAMPLE IX

| | Percent by weight |
|---|---|
| 2-trifluoromethyl-5(6)-methylbenzimidazole | 4 |
| Polyglycerol ester of stearic acid | 0.2 |
| Sodium metaborate | 95.8 |

The above formulation can be prepared by coating powdered 2-trifluoromethyl-5(6)1methylbenzimidazole on granular sodium metaborate (−25 +80 mesh), or by pelletizing the uniform mixture of components. The product can be applied as a dry granular solid, or dissolved in water and sprayed with conventional spray equipment on the plant foliage or soil.

EXAMPLE X

| | |
|---|---|
| 2-trifluoromethyl-5(6)-chlorobenzimidazole, lbs. | 0.1 |
| Alkylarylpolyethylene glycol, lbs. | 0.002 |
| Sodium metaborate (anhydrous basis), lbs. | 1.0 |
| Sodium chlorate, lb. | 0.7 |
| Water, gal. | 1 |

The above liquid formulation can be prepared by dissolving the components in water. The solution can be sprayed with conventional spray equipment on plant foliage or soil.

Other modes of applying the principle of the invention may be employed, change being made as regards the details described, provided the features stated in any of the following claims or the equivalent of such be employed.

We, therefore, particularly point out and distinctly claim as our invention:

1. 2-halo-5(6)-trifluoromethylbenzimidazole in which the halogen is bromine or chlorine.
2. 2-chloro-5(6)-trifluoromethylbenzimidazole.
3. 2-bromo-5(6)-trifluoromethylbenzimidazole.

References Cited

UNITED STATES PATENTS 3,399,987  9/1968  Woods et al. _____ 260—309.2

OTHER REFERENCES

Bednyagina et al: Chem. Abst., vol. 61; col. 8297 (1964).

Harrison et al.: Jour. Chem. Soc. (London), 1963, pp. 2934–6 relied on.

Morgan: Jour. Chem. Soc. (London), 1961, pp. 2344–5 relied on.

Zakhs et al.: Chem. Abst., vol. 60, cols. 15857–8 (1964).

HENRY R. JILES, Primary Examiner

N. TROUSOF, Assistant Examiner

U.S. Cl. X.R.

71—92